United States Patent [19]
Kerr

[11] Patent Number: 5,833,302
[45] Date of Patent: Nov. 10, 1998

[54] CAMPER MOUNTING APPARATUS

[76] Inventor: Ralph R. Kerr, 4599 Grant Rd., Central Point, Oreg. 97502

[21] Appl. No.: 854,305

[22] Filed: May 12, 1997

[51] Int. Cl.$^6$ .................................................... B60R 15/00
[52] U.S. Cl. ........................ 296/167; 296/167; 296/35.1; 296/35.3; 296/164; 296/156; 410/67; 410/80; 410/90; 414/498
[58] Field of Search .................................. 296/167, 35.1, 296/35.3, 156, 164; 410/67, 80, 90; 414/498

[56] References Cited

U.S. PATENT DOCUMENTS

| | | | |
|---|---|---|---|
| 2,942,912 | 6/1960 | Lucas et al. | 410/80 |
| 3,419,242 | 12/1968 | Gossett . | |
| 3,419,424 | 12/1968 | Gossett | 296/167 |
| 3,475,049 | 10/1969 | Overhulser . | |
| 3,508,764 | 4/1970 | Dobson et al. | 410/90 |
| 3,655,234 | 4/1972 | Kirschbaum . | |
| 3,744,840 | 7/1973 | Van Cleave . | |
| 3,814,460 | 6/1974 | Norrish . | |
| 4,243,260 | 1/1981 | Gieseking . | |
| 4,310,194 | 1/1982 | Biller . | |
| 4,354,707 | 10/1982 | Jones | 296/167 |
| 4,648,649 | 3/1987 | Beal . | |
| 5,000,633 | 3/1991 | Kowalk et al. | 410/67 |
| 5,562,390 | 10/1996 | Christenson | 414/498 |

Primary Examiner—D. Glenn Dayoan
Assistant Examiner—Kiran Patel
Attorney, Agent, or Firm—Kolisch Hartwell; Dickinson McCormack & Heuser

[57] ABSTRACT

An apparatus for mounting a camper on the bed of a vehicle. The apparatus includes a pair of laterally spaced and generally opposed stabilizers that are mounted adjacent respective side walls on the bed and have vertical, inwardly facing surfaces that are configured to engage the camper's side walls. Each stabilizer engages a respective one of the camper's side walls, and the stabilizers collectively define a mounting surface therebetween within which the camper is removably mounted and stabilized. The apparatus further includes a pair of guides for positioning the camper as the camper is mounted on the vehicle. Each guide extends at an angle generally upwardly and outwardly from the stabilizer and toward the side wall to which the stabilizer is adjacent to provide an angled surface that is configured to engage and direct the camper into the mounting surface between the stabilizers as the camper is mounted on the bed, even if the camper and the bed are originally slightly out of alignment.

23 Claims, 4 Drawing Sheets

Fig. 13

CAMPER MOUNTING APPARATUS

FIELD OF THE INVENTION

The present invention relates to campers, and more particularly to an apparatus for mounting a camper on the bed of a vehicle.

BACKGROUND AND SUMMARY OF THE INVENTION

Campers are structures that are mounted on the bed of a vehicle, such as a pickup truck. Campers are particularly popular to camping enthusiasts because they provide many of the features and advantages of a mobile home, yet still enable the vehicle on which the camper is mounted to be used independent of the camper. While campers may differ in shape and size, just as vehicle beds differ in shape and size, all campers must be positioned on the bed of a vehicle, then subsequently stabilized and secured on the bed.

To mount a camper on a vehicle's bed, the camper is first supported in a raised position that is higher than the lower surface of the vehicle's bed. Traditionally, this is done using extendable supports that are mounted on the side walls of the camper. The vehicle is then backed beneath the camper, and the camper is subsequently lowered onto the bed and secured thereon. As the vehicle is positioned beneath the camper, the vehicle and/or camper must be carefully guided in order to properly position the vehicle beneath the camper. This process is extremely time consuming because of the size and weight of the camper and the vehicle. If the camper and vehicle become misaligned during the mounting process, it is often necessary for the camper and vehicle to be returned to their original positions, and the entire process restarted. In addition, as the camper and vehicle are maneuvered into alignment with each other, the camper is prone to striking the bed, and especially the walls of the bed. When this occurs, the camper and bed may be scratched, dented or more severely damaged.

Once positioned on the vehicle, the camper is seated on the lower surface of the bed with its front surface adjacent the front wall of the bed and its side walls adjacent respective side walls or rear wheel wells of the bed. In order to prevent damage to the camper and the vehicle as the vehicle is driven, the camper must be stabilized and secured in a fitted position on the bed. Typically, this is done with a plurality of chains that are coupled between the vehicle and the camper. The chains retain the camper on the vehicle's bed and thereby reduce the degree to which the camper can shift and sway as the vehicle is driven; however, they are insufficient to completely prevent the camper from shifting and swaying as the vehicle is driven. This movement, even if reduced by the chains, is still enough to cause damage to the vehicle's bed and the camper. This damage may be primarily aesthetic, such as paint scratches and scuffing, but due to the significant weight of the camper may be much more severe, such as denting and deformation of the camper and/or bed walls.

Several attempts have been made to create devices that protect the camper and the vehicle during the camper-mounting process and the subsequent use of the camper on the vehicle. These attempts, however, all involve fairly complex assemblies of interconnected parts that must be installed in specific orientations on both the camper and the vehicle. For example, U.S. Pat. No. 4,354,707 to Jones, U.S. Pat. No. 3,419,242 to Gossett and U.S. Pat. No. 3,475,049 to Overhulser all disclose devices for mounting a camper on the bed of a pickup truck. Each device includes four spaced-apart units that are installed on the bed of the truck, and an additional set of four spaced-apart units that are installed on the side walls of the camper and are each configured to engage a corresponding one of the units on the bed. Because of the precise positioning required for the units mounted on the camper to each properly engage the corresponding unit on the bed, the devices render the camper mounting process even more time-consuming and difficult than it would be without the aid of the devices. In addition, the devices require careful planning and measurement prior to installation or else the upper and lower members of each unit will not align, thereby resulting in the camper being improperly or incompletely mounted on the bed.

Therefore, there is a need for an apparatus that enables a camper to be quickly and easily mounted on the bed of a vehicle. The apparatus must align the camper with respect to the bed, even if the camper and bed are initially misaligned. Furthermore, the apparatus must stabilize the camper on the bed once the camper is seated upon the bed.

With the above problems in mind, it is a general object of the present invention to provide a novel apparatus for mounting a camper on a vehicle.

It is another object of the present invention to provide an apparatus that automatically corrects for misalignment of the camper and the vehicle as the camper is lowered onto the bed.

It is a further object of the present invention to provide an apparatus that is quick and easy to install.

Yet another object of the present invention is a camper mounting apparatus that positions and stabilizes a camper on the bed of a vehicle, yet does not require any additional devices to be mounted on the camper.

It is another object of the present invention to provide an apparatus that can be adapted to accommodate different-sized vehicles and campers without modification of the camper body or bed of the vehicle.

One more object of the present invention is to provide an apparatus for mounting a camper on a vehicle that achieves the above results and is also economical to manufacture by virtue of having relatively few parts.

An additional object of the invention is to provide an apparatus for mounting a camper on a vehicle that does not require precisely manufactured parts.

Yet another object of the invention is to provide an apparatus that is rugged enough to tolerate the abuses expected in the operating environment.

The invention achieves these and other objects in the form of an apparatus for mounting a camper with a front wall and opposed side walls on a vehicle having a bed with a front wall and opposed side walls. The apparatus includes a pair of laterally spaced and generally opposed stabilizers that are mounted adjacent respective side walls on the bed and have vertical, inwardly facing surfaces that are configured to engage the camper's side walls. Each stabilizer engages a respective one of the camper's side walls, and the stabilizers collectively define a mounting surface therebetween within which the camper is removably mounted and stabilized. The apparatus further includes a pair of guides for positioning the camper as the camper is mounted on the vehicle. Each guide extends at an angle generally upwardly and outwardly from the stabilizer and toward the side wall to which the stabilizer is adjacent to provide an angled surface that is configured to engage and direct the camper into the mounting surface between the stabilizers as the camper is mounted on the bed, even if the camper and the bed are originally slightly out of alignment.

Many other features, advantages and additional objects of the present invention will become manifest to those versed in the art upon making reference to the detailed description which follows and the accompanying sheets of drawings in which preferred embodiments incorporating the principles of this invention are disclosed as illustrative examples only.

DETAILED DESCRIPTION OF THE PREFERRED EMBODIMENTS

Figure 1:
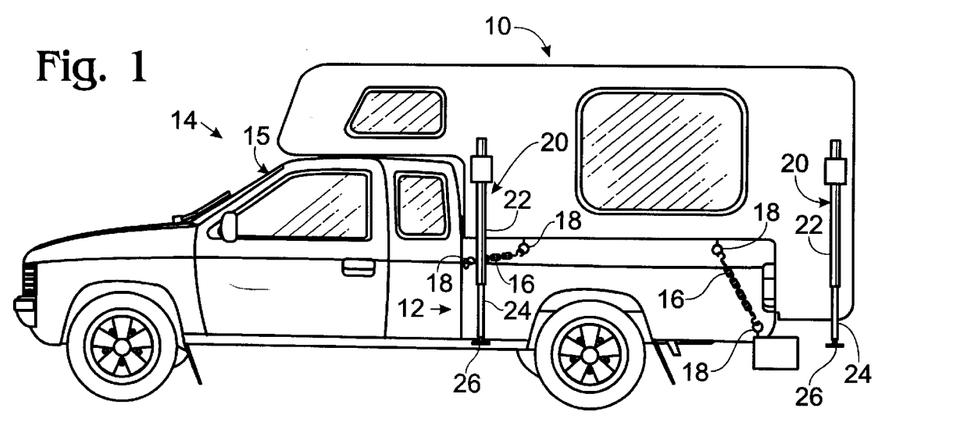
FIG. 1 is a side elevational view of a camper mounted on the bed of a truck.

In FIG. 1, a camper is indicated generally at 10 and is shown mounted on the bed 12 of a vehicle. The vehicle, a pickup truck is generally indicated at 14 and includes a cab 15. Camper 10 is secured on bed 12 by a pair of tie-downs 16 which are coupled to the vehicle and camper by eye-bolts 18. It should be understood that a corresponding pair of tie-downs is also present on the opposite side of the vehicle shown in FIG. 1. Camper 10 further includes plural retractable supports 20, a pair of which is mounted on each side of the camper and extend downwardly therefrom. Each support includes an outer member 22, an inner member 24 that telescopes within the outer member, and a base 26 that is configured to engage the ground or other surface on which the camper is supported when not mounted on the vehicle.

Figure 2:
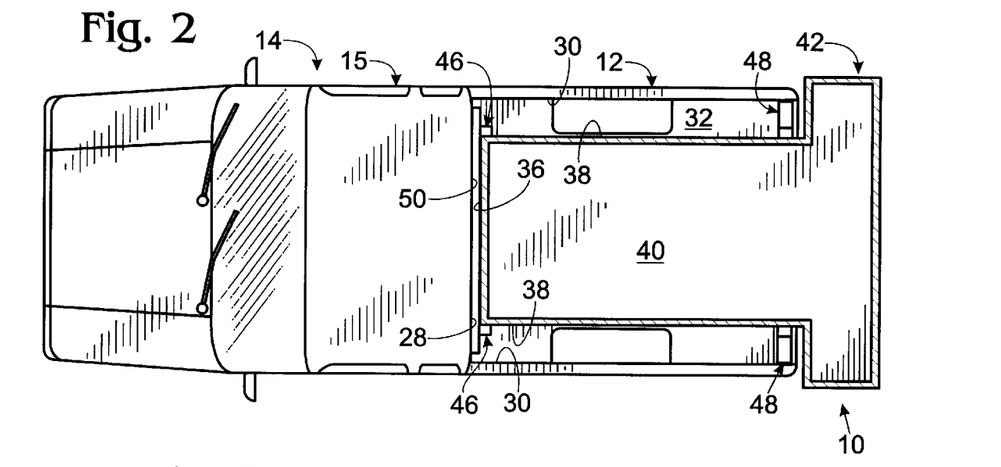
FIG. 2 is a top plan view of the truck and camper shown in FIG. 1, with the top portion of the camper removed. Also shown in FIG. 2 is a camper mounting apparatus constructed in accordance with a preferred embodiment of the invention. The apparatus includes generally opposed pairs of forward and rearward assemblies that are mounted on the bed of the vehicle to position and stabilize the camper.
Figure 3:
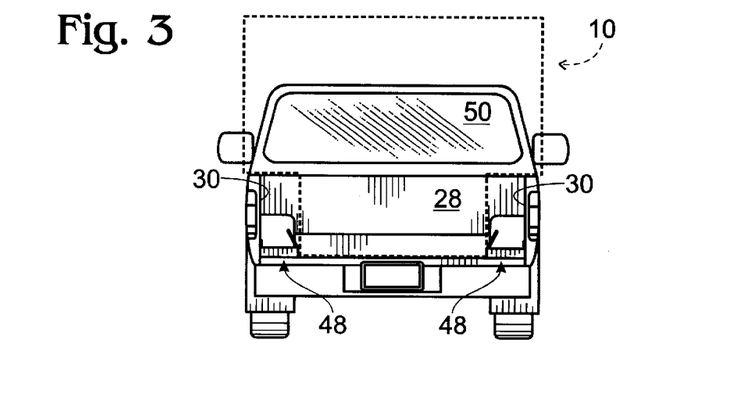
FIG. 3 is a rear elevational view of the truck, camper and the rearward assemblies of the apparatus shown in FIGS. 1 and 2, with the camper shown in dashed lines.

FIG. 2 is a top plan view showing camper 10 and vehicle 14, with the top portion of the camper removed to show bed 12 in more detail. Similarly, FIG. 3 is a rear elevational view of the vehicle with the camper shown in dashed lines. As shown, the bed includes a forward wall 28, side walls 30, and a lower surface 32. Camper 10 includes a forward wall 36, side walls 38, a lower surface 40, and rearward portion 42. It should be understood that campers and vehicles, alike, will vary in size and shape, and that the specific embodiments shown are for illustrative purposes and form no part of the claimed invention. Many conventional campers include a rubber bumper adjacent the camper's front wall. The bumper is designed to protect the camper and vehicle, but generally becomes detached from the camper after several uses. The present invention may be used with a camper that includes or does not include this bumper, but it is actually preferred that the bumper be removed because the invention protects, positions and stabilizes the camper on the vehicle's bed to such a degree that the bumper is rendered obsolete, as discussed below.

Also shown in FIGS. 2 and 3, is a camper mounting apparatus constructed in accordance with a preferred embodiment of the invention. The apparatus includes a pair of forward assemblies 46 and a pair of rearward assemblies 48. The apparatus is installed on the bed of the vehicle prior to the mounting of the camper, and it is configured to properly align the camper and vehicle, even if they are initially misaligned. Furthermore, once aligned and mounted on the bed, the apparatus stabilizes the camper in a defined position on the bed to constrain the camper from shifting or otherwise moving with respect to the bed. By doing so, the apparatus protects both the camper and the vehicle from such damage as scratches, dents, weakened structural integrity, deformations, etc., and thereby prolongs the life of both units.

Figures 4, 5, 6:
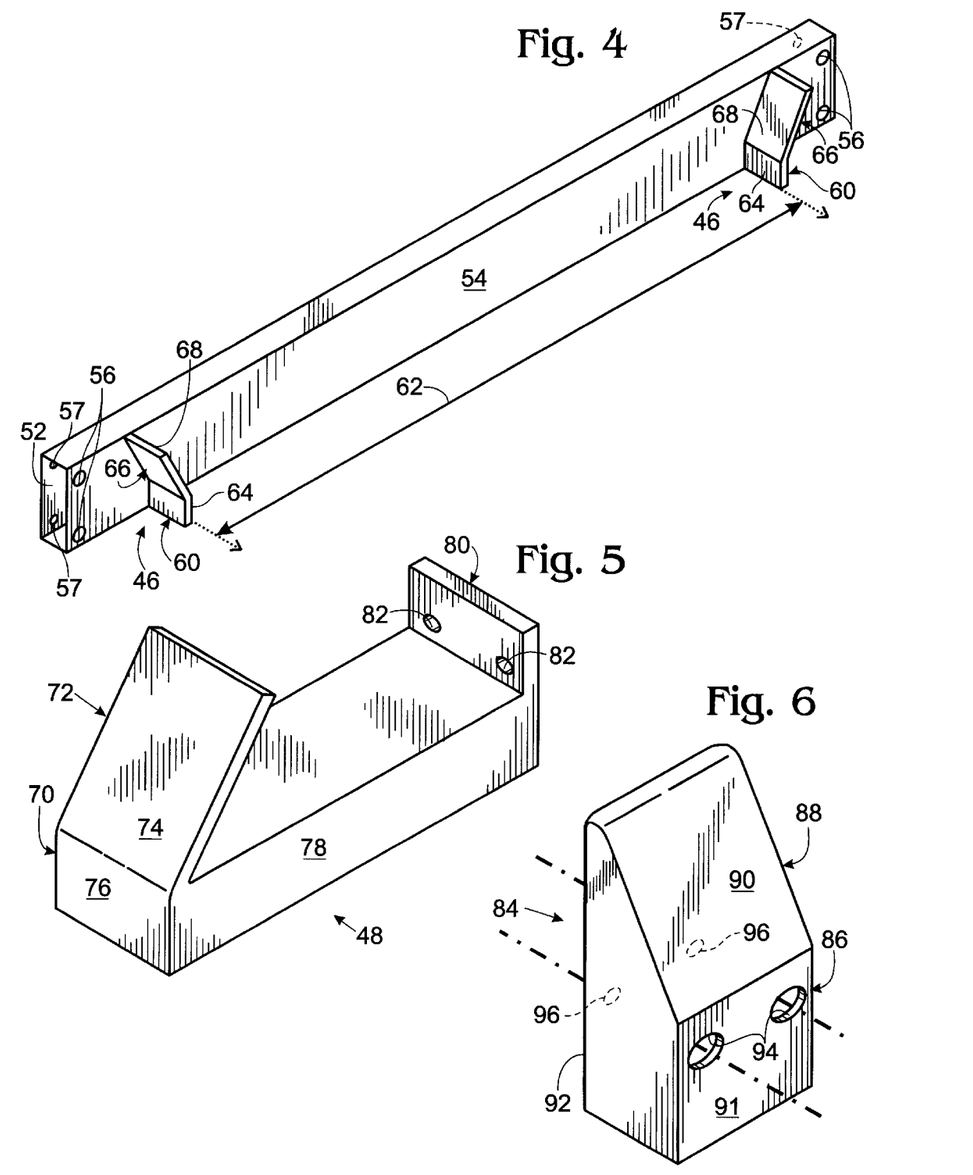
FIG. 4 is an isometric view of the forward assemblies of the apparatus constructed in accordance with a preferred embodiment of the present invention and mounted in a spaced-apart relationship on an elongate spacer.
FIG. 5 is an isometric view of one of the rearward assemblies of the apparatus shown in FIGS. 2 and 3.
FIG. 6 is an isometric view of an alternate embodiment of the rearward assembly shown in FIG. 5.

Forward assemblies 46 are shown in FIG. 4, and are mounted in a spaced-apart, generally opposed relationship on a spacer 48. By referring briefly back to FIG. 2, it can be seen that the spacer is mounted on lower surface 32 of the bed adjacent and generally parallel to front wall 28 and is sized to substantially span the distance between the bed's side walls. The spacer is mounted and sized to maintain the front walls of the bed and the camper in a spaced relationship with each other. In addition to protecting the front walls of the bed and the camper, the spacer also protects the rear portion 50 of the vehicle's cab by preventing the front wall of the camper from impacting or otherwise damaging the cab when the camper is loaded onto, transported by, or removed from the vehicle. It should be understood that rear portion 50 may extend further rearwardly than the front wall of the bed. If so, spacer 48 may need to be mounted in a spaced relationship to the bed's front wall to prevent the camper from striking and damaging the rear portion of the cab.

As shown in FIG. 4, the spacer has a generally rectangular, hollow cross-sectional configuration with forward and rearward surfaces 52 and 54, and a plurality of mounting holes in each end of both surfaces. As shown, the holes 56 in rearward surface 54 have a larger diameter than the holes 57 in the forward surface, and thereby enable a tool to be inserted through the hole in the rearward surface to install a bolt or other suitable fastening mechanism through the hole in the forward surface and into the front wall of the bed. It should be understood, however, that the spacer may have a variety of shapes and cross-sectional configurations. An example of an alternate embodiment of the spacer is a generally planar or surface-like unit that is mounted on the bed in a rearwardly spaced, generally parallel orientation with respect to the front wall of the bed.

Turning back to the forward assemblies shown in FIG. 4, the reader can see that the forward assemblies are mounted on rearward surface 54 of the spacer and extend rearwardly therefrom. Each assembly 46 includes a stabilizer 60 that is mounted in a laterally spaced and generally opposed relationship on rearward surface 54. The stabilizers collectively define a mounting surface or passage 62 therebetween within which at least a portion of the camper is removably mounted and stabilized. Each stabilizer has a vertical, inwardly facing surface 64 that is configured to engage a respective one of the camper's side walls 38. The stabilizers also may be described as being generally vertical and extending rearwardly from the spacer.

Each forward assembly 46 of the apparatus further includes a guide 66 for positioning at least a portion of the camper as the camper is mounted on the vehicle. Each guide 66 extends at an angle generally upwardly and outwardly from a respective one of the stabilizers and further extends toward the side wall of the vehicle to which the stabilizer is adjacent when the apparatus is installed on the vehicle's bed. The guides provide an angled surface that is configured to engage and direct the camper into mounting surface 62 between the stabilizers as the camper is mounted on the bed, even if the camper and the bed are originally slightly out of alignment. Each guide extends upwardly from the corresponding stabilizer and toward the side wall at an angle in the range of approximately 110° and 170° with respect to the stabilizer. Preferably, the angle is in the range of approximately 130° and 165°. Even more preferably, the angle is in the range of 150° and 160°.

As shown in FIG. 4, each guide includes a ramp structure 68 that provides alignment correction for any misalignment of the camper relative to the stabilizers. As shown, each ramp structure 68 is a generally planar surface. Other configurations are possible, such as a arcuate concave or convex surface, but a planar surface is preferred because it provides the same degree of slope along the entire surface. With a concave or convex surface, the slope varies along the length of the surface, and therefore the camper's downward path would accelerate or decelerate according to the angle of the surface which is engaged by the camper at a particular moment. In addition, the guides and ramp structure may include a narrow rail or bar, instead of the previously described surface, however the surface is preferred because it provides additional surface area of contact between the ramp structure and the edge of the camper which engages the guide. This increased surface area of contact reduces the likelihood of the edge being damaged or worn away as the camper is repetitively mounted on the vehicle.

By referring briefly back to FIGS. 2 and 3, the reader will see that the apparatus preferably includes a pair of rearward assemblies 48, one mounted adjacent each of the vehicle's side walls 30 and extending generally inwardly therefrom. One of the rearward assemblies is shown in FIG. 5, and it should be understood that the other rearward assembly has a similar shape, size and configuration. Assembly 48 includes a generally vertical stabilizer 70 and a guide 72, which is coupled to the stabilizer and extends an angle upwardly and outwardly therefrom to provide a surface or ramp structure 74 for establishing alignment between the rear portion of the camper and the rearward stabilizers, even if the rearward stabilizers and rear portion are initially slightly out of alignment. It should be understood that the rearward assemblies have the same shape, configuration and sub-components as the previously discussed forward assemblies. Furthermore, as shown in FIGS. 2 and 3, rearward stabilizers 70 collectively define a passage between them that is sized to receive the rear portion of the camper, and each stabilizer includes an inwardly oriented vertical surface 76 (indicated in FIG. 5) that engages a respective one of the camper's side wall's.

Each rearward assembly further includes a lateral spacer 78 that extends outwardly from stabilizer 76 toward the corresponding side wall of the vehicle when the assembly is installed on the vehicle's bed, as shown in FIGS. 2 and 3. Spacer 78 further includes an end region 80 distal the stabilizer and configured to be coupled to the bed of the vehicle. As shown, portion 80 extends generally upwardly from the spacer and includes a pair of mounting holes 82 through which a bolt or other suitable fastening device is inserted to secure the assembly to the bed of the vehicle. It should be understood that lateral spacer 78 should be of a sufficient length to permit portion 80 to be mounted on one of the vehicle's side walls and also to permit the stabilizer to engage the camper's side wall.

By referring back to FIG. 2, the reader can see that the stabilizers and guides on the forward and rearward assemblies are aligned with respect to a line extending generally parallel to the vehicle's side walls. As shown, each side wall 38 of the camper is engaged by a stabilizer on both of the forward and rearward assemblies. Furthermore, each pair of stabilizers is mounted on the bed so that the distance between the stabilizers generally matches the outer dimensions of the side walls of the camper. This enables the camper to be securely maintained in a defined position on the bed and constrains the camper from shifting or swaying when transported on the vehicle.

As discussed, campers and vehicles may vary in size, shape and configuration. One common variation is the width of the camper or bed of the vehicle. Therefore, it should be understood that the length of lateral spacer 78 may be varied to accommodate specific sizes of campers and specific vehicles. In addition, the position of the forward assemblies on spacer 54 may also be varied to accommodate different sized campers, and the length of spacer 54 may also be varied to fit between the side walls of different sized vehicles.

In many campers, one side, and especially the rearward portion of one side, of the camper extends further away from the camper's longitudinal axis than the other side specifically, the rear portion of one side of the camper often extends outwardly further than the rest of the corresponding side. The projection is caused by a box or housing on the camper for the camper's plumbing. Because of the variation in the space between the camper's side walls and the bed's side walls caused by this projection, it is often advantageous to use an alternate embodiment of the rearward assembly, which is shown in FIG. 6 and indicated generally at 84.

Assembly 84 includes a stabilizer 86 and guide 88 configured, shaped, and having the same sub-components as the previously described forward and rearward assemblies. The guide extends upwardly and outwardly from the generally vertical stabilizer and includes a ramp structure 90 for automatically guiding the camper into alignments between a passage or mounting surface between the inwardly extending faces 91 of the opposed assemblies when mounted on the vehicle. Assembly 84 includes an outwardly oriented surface 92 that extends downwardly from the top of guide 88 and is configured to be mounted on the bed adjacent one of the bed's side walls 30, and preferably immediately adjacent the side wall. In addition, assembly 84 includes a pair of laterally spaced mounting holes 94 which extend through the inwardly oriented face 88 of stabilizer 86 and aligned pair of mounting holes 96 in outwardly oriented surface 92. The diameters of mounting holes 94 and 96 are configured similar to the previously described mounting holes 56 and 57, respectively, on spacer 54 in that mounting hole 94 has a larger diameter than mounting hole 96 and thereby permits a tool or other device to be inserted through mounting hole 94 to secure a bolt or other fastener through mounting hole 96 and into the bed of the vehicle. Furthermore, similar to the generally opposed pair of rearward assemblies 48, it should be understood that a pair of assemblies 84 should be mounted in a generally opposed, spaced-apart relationship with one assembly mounted adjacent each side wall of the vehicle's bed so that the stabilizers 86 define a passage or mounting surface therebetween within which the camper is mounted.

Figures 7, 8:
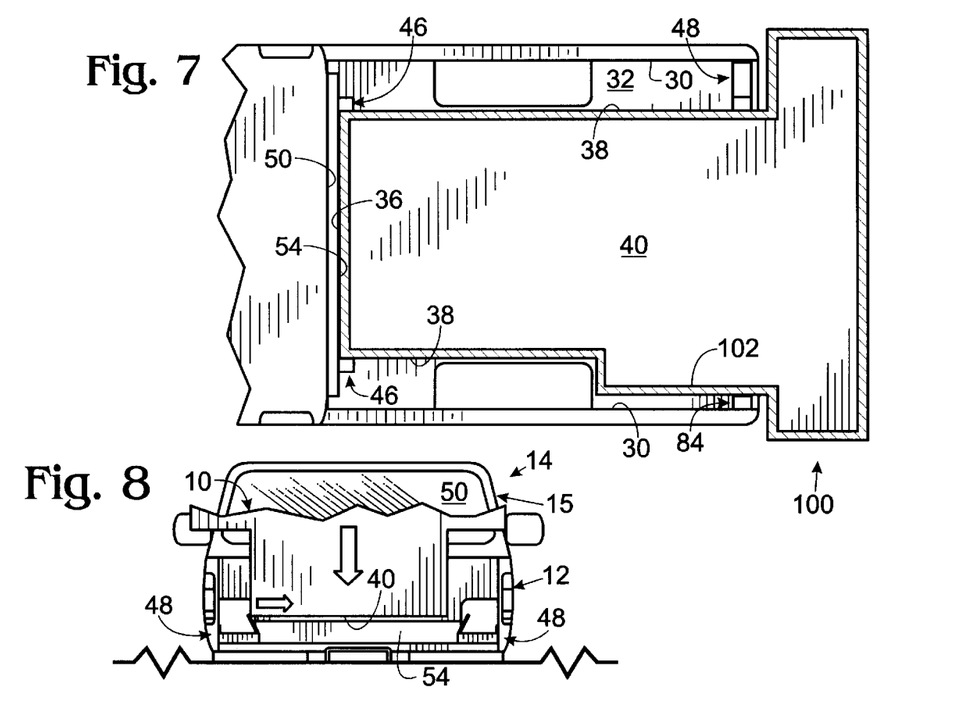
FIG. 7 is a top plan view of the truck camper and apparatus shown in a view similar to FIG. 2, only with a different sized camper and the embodiments of the rearward assemblies shown in FIGS. 5–6.
FIG. 8 is a rear elevational view showing the apparatus shown in FIG. 2 being used to mount a camper on the bed of the truck. As shown, the camper is positioned above the bed of the truck and is laterally offset from the mounting position shown in FIG. 3.

FIG. 7 is very similar to FIG. 2 in that it is a top view showing the vehicle's bed with a camper mounted thereon and stabilized by the apparatus of the present invention. The camper is indicated generally at 100 and is identical to the previously described camper 10, except that the rearward portion 102 of one of the camper's side walls 38 extends further outwardly than the rest of the side wall. Because of this increased width near the rear portion of the vehicle, the previously described rearward assemblies 48 cannot be used on both sides of the camper. Instead, as shown, the camper is mounted and stabilized on the bed using the previously described pair of forward assemblies 46, one of the previously described rearward assemblies 48, and one of the alternate embodiment of the rearward assemblies, namely assembly 84. The rearward assemblies 48 and 84 are mounted in a generally opposed relationship, one adjacent each side wall of the vehicle and extending inwardly therefrom to collectively define a mounting surface or passage between their respective stabilizers for receiving and securing the camper.

It should be understood that it is intended to be within the scope of the present invention that many other combinations and arrangements of the previously described assemblies may be selectively used to mount campers of varying size on vehicles that have beds with different shapes and sizes. For example, while the preferred embodiment includes opposed pairs of forward and rearward assemblies, as described above, it is fully intended to be within the scope of the invention that a single pair of any of the previously described assemblies, one mounted adjacent each side wall of the vehicle's bed, could be used to position and stabilize a camper on the bed of a vehicle. Furthermore, while the previously discussed embodiments have been shown and described as being mounted on the vehicle's side walls, it should be understood that other mounting positions are possible and are intended to be within the scope of the invention. For example, the assemblies may be mounted to the lower surface of the bed, or may be mounted in a spaced-apart relationship from the side wall. In addition, the corresponding assemblies on opposite sides of the vehicle's bed may, but do not necessarily have to, be aligned with each other with respect to a line extending parallel to the bed's front wall. Thus, the exact placement and spacing, and even the specific assembly to be used, should be decided by the user's personal preferences as well as the shape and size of the user's vehicle's bed and camper.

It should also be understood that the previously described spacers may vary in length to accommodate vehicles and campers of different sizes. In addition, spacers 54 and 78 may be adjustable through any suitable mechanical means to enable the relative positioning of a pair of assemblies with respect to the vehicle's side walls to be adjusted, thereby enabling the apparatus to be adjusted for use with campers of different sizes without requiring individual assemblies to be removed and replaced, or to require additional mounting holes to be introduced into the vehicle's bed.

In a further variation of the invention, spacer 48 may be mounted on the bed independent of the forward assemblies and may extend only a portion of the way between the assemblies. As such, the spacer would still protect the front wall of the bed and the rearward surface of the cab from being damaged as the camper is mounted on the vehicle's bed, but the forward assemblies would not be mounted on the spacer. Instead, the forward assemblies would be mounted on the bed, in a similar fashion as any of the previously described rearward assemblies.

In a further embodiment of the invention, the forward spacer is replaced by one or more of the previously described assemblies, which is installed adjacent the front wall of the bed and oriented so that its stabilizer is oriented away from the front wall of the bed. This embodiment provides the additional advantage that it guides the forward and rearward placement of the camper on the bed as the camper is mounted on the bed. Similarly, spacer 54 may include a guide which is similar to any of the previously described guides, and which extends upwardly and generally forwardly from the rear surface of the spacer to provide this additional positioning of the camper.

From the foregoing description, it can be seen that the invented apparatus provides a unique, yet relatively simple, structure for mounting a camper on a vehicle's bed. The apparatus not only stabilizes the camper on the bed, but also guides the camper into the proper mounting position and even corrects for misalignment of the camper with respect to the vehicle. In addition, the similarities of shape amongst campers and vehicles enables the components of the apparatus to be interchanged and adapted to be used with virtually any conventional camper and virtually any conventional vehicle's bed.

To use the apparatus to mount a camper on the bed of a vehicle, the camper is first supported in a raised position so that the lower surface of the camper is higher than the lower surface of the vehicle's bed. An example of devices used to elevate the camper are the previously described supports 20. Preferably, the lower surface of the camper should be supported at an elevation higher than the stabilizers on the apparatus, and more preferably, higher than the stabilizers but not higher than the top of the guides. Generally, this height will be approximately three to six inches above the lower surface of the bed, although this range may vary, depending on the dimensions of the particular embodiment of the apparatus installed on the vehicle.

Next, the vehicle is positioned proximate the camper so that the rear portion of the vehicle's bed is generally adjacent the front wall of the camper and the front wall of the bed is oriented away from the camper. The vehicle and camper should be generally aligned, although the unique structure of the invented apparatus will automatically correct for slight misalignment of the camper and the vehicle. This feature alone significantly reduces the time and hassle of mounting a camper on a vehicle.

Figure 9:
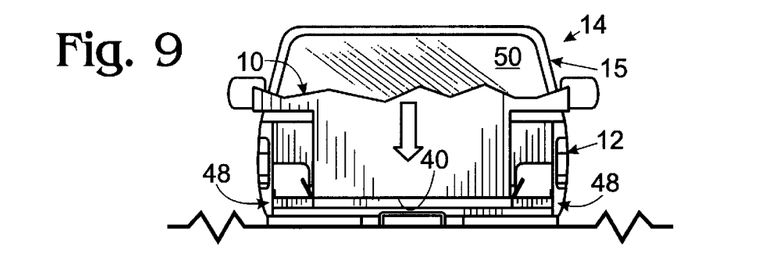
FIG. 9 is a rear elevational view showing the truck, camper and apparatus shown in FIG. 8, with the camper translated horizontally and vertically from the position shown in FIG. 8.
Figure 10:
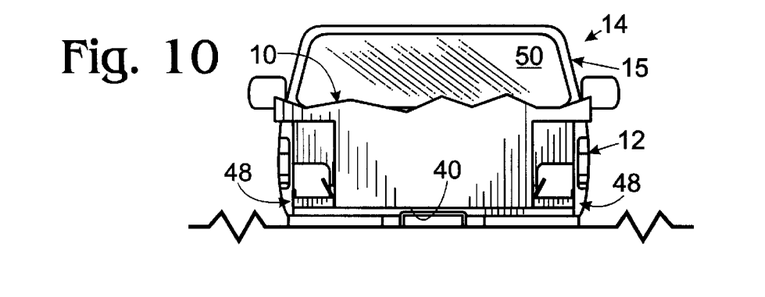
FIG. 10 is a rear elevational view showing the truck, camper and apparatus shown in FIGS. 8 and 9, with the camper properly mounted on the bed.

The vehicle is then backed beneath the camper. As the vehicle is backed under the camper, the upper portions of the guides engage the lower edges of the camper and adjust the lateral position of the camper with respect to the vehicle. Once the front wall of the camper is adjacent the cab's rear portion and the elongate spacer, and the camper's side walls are generally adjacent and above the forward and rearward stabilizers, as shown in FIG. 8, the camper is then lowered onto the bed of the vehicle. As the camper is lowered, the guides further adjust the lateral and rotational position of the camper with respect to the vehicle's bed. As shown and indicated with arrows in FIGS. 8 and 9, the guides automatically correct for the misalignment of the camper with respect to the bed as the camper is lowered onto the bed. Once fully mounted on the vehicle, as shown in FIG. 10, the guides and spacer stabilize the camper within the vehicle's bed. The individual components of the apparatus cooperate to prevent the camper from moving or shifting within the vehicle, thereby protecting the camper and the vehicle from being damaged.

Figure 11:
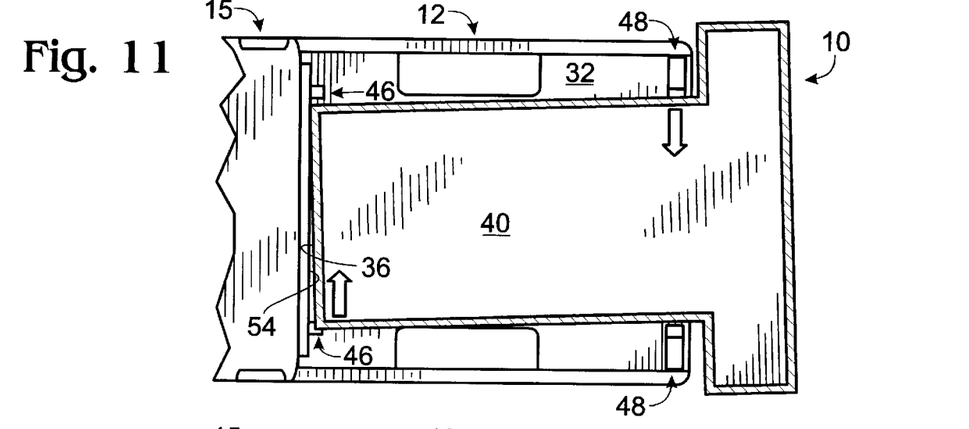
FIG. 11 is a top plan view showing the apparatus shown in FIG. 2 being used to mount a camper on the bed of the truck. As shown, the camper is positioned above the bed of the truck and is rotationally offset from the mounting position shown in FIG. 2.
Figure 12:
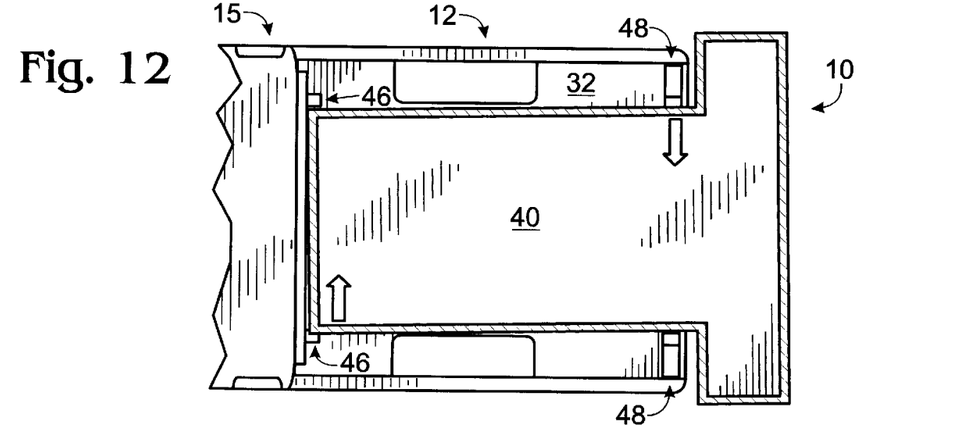
FIG. 12 is a top plan view showing the truck, camper and apparatus shown in FIG. 11, with the guides automatically correcting the rotational misalignment of the camper with respect to the bed as the camper is lowered onto the bed.
Figure 13:
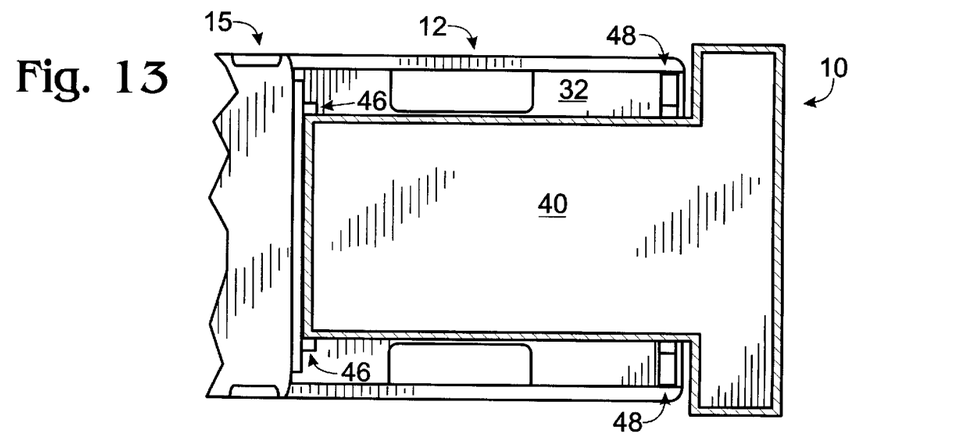
FIG. 13 is a top plan view showing the truck, camper and apparatus shown in FIG. 11, with the camper properly mounted on the bed.

Furthermore, as shown in FIGS. 11–13, the previously described apparatus corrects for rotational, as well as translational, misalignment of the camper with respect to the bed. In FIG. 11, the camper is positioned above the bed, with the camper's front wall generally adjacent the rear portion of the cab and the rear surface of the spacer, and the camper's side walls each generally adjacent a corresponding pair of forward and rearward assemblies. Unlike the position described above and shown in FIG. 8, the camper shown in FIG. 11 is rotationally misaligned with respect to the bed. Nonetheless, as the camper is lowered onto the bed and engaged by the guides, the apparatus still automatically corrects for the misalignment of the camper with respect to the bed and properly positions the camper with respect to the bed as the camper is lowered onto the bed. In FIG. 12, the camper has been rotated from the position shown in FIG. 11, and will continue to be rotated in the direction indicated by the arrows shown in FIGS. 11 and 12 until it is fully aligned with the bed of the camper and positioned within the mounting surfaces defined by the forward and rearward stabilizers, as shown in FIG. 13.

It should therefore be understood that the invented apparatus corrects for all forms of rotational and translational alignment of the camper with respect to the bed of the vehicle as the camper is lowered onto the bed of the vehicle. Furthermore, by including a guide adjacent the rear portion of the cab and extending generally upwardly and forwardly from the bed, as discussed previously, the apparatus automatically corrects for misalignment of the camper with respect to the bed caused by the vehicle being backed too far beneath the lower surface of the camper.

While the present invention has been shown and described with reference to the foregoing preferred embodiment, it is to be understood by those of skill in the art that other changes in form and detail may be made therein without departing from the spirit and scope of the invention as defined in the appended claims.

I claim:

1. An apparatus for mounting a camper with a front wall and opposed side walls on a vehicle having a bed with a front wall and opposed side walls, the apparatus comprising:

a pair of laterally spaced and generally opposed stabilizers mounted adjacent respective side walls on the bed and having vertical, inwardly facing surfaces configured to engage the camper's side walls, the stabilizers collectively defining a mounting surface therebetween within which at least a portion of the camper is removably mounted and stabilized, wherein each stabilizer engages a respective one of the camper's side walls; and a pair of guides for positioning the camper as the camper is mounted on the vehicle, each guide extending at an angle generally upwardly and outwardly from the stabilizer and toward the side wall of the vehicle to which the stabilizer is adjacent to provide an angled surface that is configured to engage and direct the camper into the mounting surface between the stabilizers as the camper is mounted on the bed, even if the camper and the bed are originally slightly out of alignment.

2. The apparatus of claim 1, wherein the guides include ramp structure for enabling self-alignment of the camper into the mounting surface as the camper is mounted on the bed.

3. The apparatus of claim 1, wherein each guide extends upwardly from the corresponding stabilizer and outwardly toward the side wall of the bed adjacent the stabilizer at an angle in the range of approximately 110° and 170° relative to the stabilizer.

4. The apparatus of claim 1, wherein the apparatus further includes a spacer coupled between the stablizers and the front wall of the bed and configured to engage the front wall of the camper when the camper is mounted on the bed.

5. The apparatus of claim 4, wherein the spacer is elongate and extends substantially between the side walls of the bed, and wherein the pair of stabilizers are mounted in a spaced relationship on the spacer and extend generally rearwardly therefrom.

6. The apparatus of claim 1, wherein at least one of the stabilizers includes a lateral spacer extending outwardly from the stabilizer toward the corresponding side wall and having an end region coupled to the bed of the vehicle.

7. The apparatus of claim 1, wherein stabilizers are forward stabilizers, the guides are forward guides, and the apparatus further includes a pair of rearward stabilizers and a pair of rearward guides configured similar to the forward stabilizers and the forward guides and mounted on the bed in a spaced-apart relationship to the forward stabilizers and the forward guides.

8. An apparatus for mounting a camper with a front wall and opposed side walls on a vehicle including a bed with a forward wall and opposed side walls, the apparatus comprising:

a pair of generally vertical stabilizers positioned adjacent respective side walls of the bed in a laterally spaced relationship to define a passage therebetween that is sized to receive the camper; each stabilizer being configured to engage a respective one of the camper's side walls when the camper is mounted on the bed; and a pair of guides for automatically positioning the camper as the camper is mounted on the vehicle, each guide extending at an angle generally upwardly and outwardly from the stabilizer and toward the side wall to which the stabilizer is adjacent to engage and direct the camper into the passage between the stabilizers as the camper is mounted on the bed, even if the camper and bed are originally slightly out of alignment.

9. The apparatus of claim 8, wherein each guide includes ramp structure that provide alignment correction for misalignment of the camper relative the stabilizers.

10. The apparatus of claim 8, wherein each guide extends upwardly from the corresponding stabilizer and toward the side wall of the bed adjacent the stabilizer at an angle in the range of approximately 110° and 170° with respect to the stabilizer.

11. The apparatus of claim 8, wherein the apparatus further includes a spacer mounted on the bed generally adjacent the front wall of the bed and configured to engage the front wall of the camper when the camper is mounted on the bed.

12. The apparatus of claim 11, wherein the spacer is elongate and substantially spans the distance between the side walls of the bed.

13. The apparatus of claim 12, wherein the stabilizers are mounted on the spacer and extend generally rearwardly therefrom, the stabilizers and spacer cooperating to provide lateral and forward bounds to the passage within which the camper is positioned as the camper is mounted on the vehicle.

14. The apparatus of claim 8, wherein at least one of the stabilizers includes a lateral spacer extending outwardly from the stabilizer toward the corresponding side wall and having an end coupled to the vehicle.

15. The apparatus of claim 8, wherein stabilizers are forward stabilizers, the guides are forward guides, and the apparatus further includes a pair of rearward stabilizers and a pair of rearward guides similar to the forward stabilizers and the forward guides and mounted on the bed in a spaced-apart relationship to the forward stabilizers and the forward guides.

16. An apparatus for mounting a camper with opposed side walls and front and rear portions on a vehicle including a bed with a front wall and opposed side walls, the apparatus comprising:

an elongate spacer configured to be mounted on the bed adjacent and generally parallel to the front wall for maintaining the front portion of the camper in a spaced relationship with the front wall of the bed, wherein the spacer is sized to substantially span the distance between the bed's side walls, and further wherein the spacer has a rearward region that is oriented away from the front wall of the bed;

a pair of laterally spaced forward assemblies extending rearwardly from the rearward region of the spacer in a generally opposed relationship for positioning and stabilizing at least a portion of the camper on the vehicle, each assembly comprising, a generally vertical forward stabilizer coupled to the rearward region of the spacer, wherein the forward stabilizers collectively define a passage sized to receive the front portion of the camper, and a forward guide coupled to the forward stabilizer and extending at an angle upwardly and outwardly therefrom to provide a surface for establishing alignment between the front portion of the camper and the forward stabilizers, even if the forward stabilizers and front portion are initially slightly out of alignment; and a pair of generally opposed, laterally spaced rearward assemblies for positioning and stabilizing at least a portion of the camper on the vehicle, each rearward assembly mounted on the bed generally adjacent to a respective one of the vehicle's side walls rearward of the forward assemblies and comprising, a generally vertical rearward stabilizer, wherein the rearward stabilizers collectively defining a passage sized to receive the rear portion of the camper, and a rearward guide coupled to the rearward stabilizer and extending at an angle upwardly and outwardly therefrom to provide a surface for establishing alignment between the rear portion of the camper and the rearward stabilizers, even if the rearward stabilizers and the rear portion are initially slightly out of alignment.

17. The apparatus of claim 16, wherein the forward and the rearward stabilizers are aligned with respect to a line extending generally parallel to the vehicle's side walls.

18. The apparatus of claim 16, wherein the apparatus further includes at least one rearward spacer coupled between one the vehicle's side walls and the corresponding rear assembly.

19. The apparatus of claim 16, wherein the apparatus further includes a pair of rearward spacers, each coupled between a respective one of the vehicle's side walls and the corresponding rearward assembly.

20. The apparatus of claim 19, wherein the spacer has a generally rectangular, hollow cross-section.

21. The apparatus of claim 16, wherein only one of the rearward assemblies is aligned with its corresponding forward assembly along a line extending generally parallel to the vehicle's side walls.

22. The apparatus of claim 16, wherein the stabilizers are mounted on the bed so that the distance between the stabilizers generally matches the outer dimensions of the side walls of the camper.

23. The apparatus of claim 16, wherein the guides provide alignment correction for misalignment of the camper relative to the bed.

* * * * *